(12) United States Patent
Akimoto et al.

(10) Patent No.: US 9,784,362 B2
(45) Date of Patent: Oct. 10, 2017

(54) VEHICLE DRIVE DEVICE

(71) Applicant: TOYOTA JIDOSHA KABUSHIKI KAISHA, Toyota-shi (JP)

(72) Inventors: Kensuke Akimoto, Sunto-gun (JP); Yoshinobu Nozaki, Anjo (JP); Hirotatsu Kitabatake, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/307,321

(22) PCT Filed: Jun. 11, 2015

(86) PCT No.: PCT/JP2015/067530
§ 371 (c)(1),
(2) Date: Oct. 27, 2016

(87) PCT Pub. No.: WO2015/190621
PCT Pub. Date: Dec. 17, 2015

(65) Prior Publication Data
US 2017/0045133 A1 Feb. 16, 2017

(30) Foreign Application Priority Data

Jun. 12, 2014 (JP) .................................. 2014-121662
Apr. 1, 2015 (JP) .................................. 2015-074708

(51) Int. Cl.
*G06F 7/00* (2006.01)
*F16H 57/04* (2010.01)
*B60K 11/02* (2006.01)

(52) U.S. Cl.
CPC .......... *F16H 57/0413* (2013.01); *B60K 11/02* (2013.01); *F16H 57/0476* (2013.01);
(Continued)

(58) Field of Classification Search
CPC ............. F16H 57/0413; F16H 57/0476; F16H 57/0483; B60K 11/02
(Continued)

(56) References Cited

U.S. PATENT DOCUMENTS 8,219,289 B2 * 7/2012 Kamada .................. B60T 1/005
192/220.2
2010/0023193 A1 * 1/2010 Ebuchi .................... B60K 6/365
701/22

(Continued)

FOREIGN PATENT DOCUMENTS

JP 2006-207606 A 8/2006

OTHER PUBLICATIONS

International Search Report and Written Opinion Issued Nov. 11, 2015 in PCT/JP15/067530 Filed Jun. 11, 2015.

*Primary Examiner* — Muhammad Shafi
(74) *Attorney, Agent, or Firm* — Oblon, McClelland, Maier & Neustadt, L.L.P.

(57) ABSTRACT

A vehicle drive device includes: an oil pump; an oil cooler; a bypass oil passage configured to bypass the oil cooler; a control valve; and a control unit. The control unit keeps the control valve in a first state while a temperature of oil circulated by the oil pump is lower than a predetermined value, and switches the control valve to a second state when the temperature of the oil circulated by the oil pump becomes not lower than the predetermined value while the control valve is in the first state. The control unit changes a voltage command value of an electric motor to a value smaller than a voltage command value corresponding to a required output of the electric motor after elapse of a predetermined period from a time the control valve is switched to the second state.

10 Claims, 6 Drawing Sheets

(52) U.S. Cl.
CPC ...... *F16H 57/0483* (2013.01); *B60Y 2306/05* (2013.01); *B60Y 2400/302* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 2011/0231043 | A1* | 9/2011 | Ebuchi .................. | B60K 6/365 701/22 |
| 2012/0095635 | A1* | 4/2012 | Kanno ................ | B60W 10/026 701/22 |
| 2012/0102995 | A1* | 5/2012 | Sakata .................... | B60L 1/003 62/238.1 |
| 2015/0291149 | A1* | 10/2015 | Kitabatake ............. | B60K 6/445 701/22 |

* cited by examiner

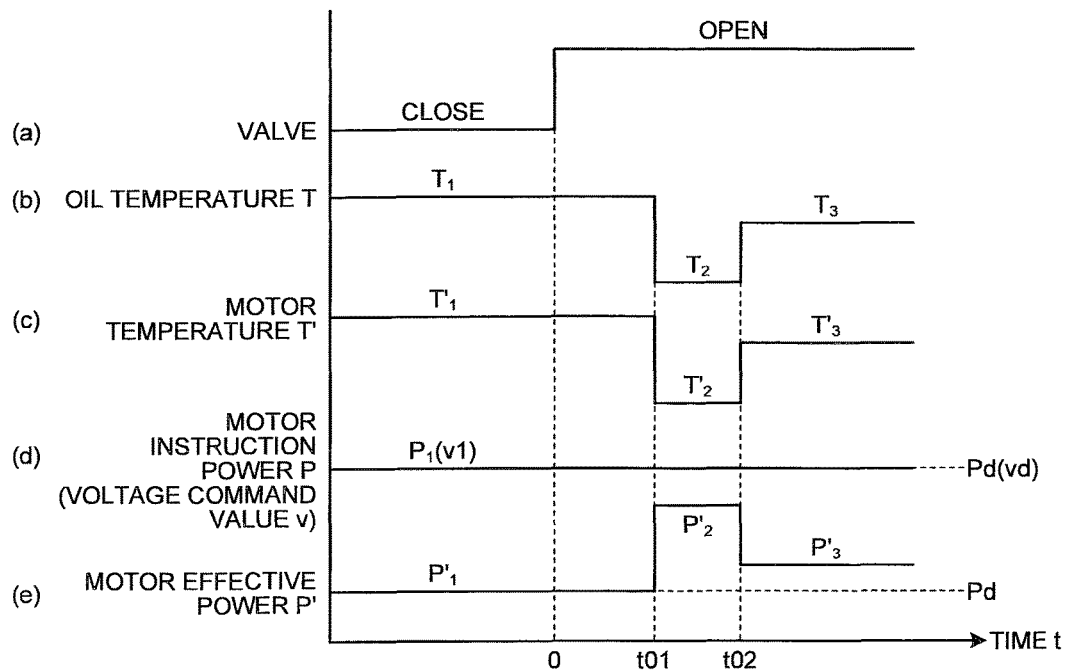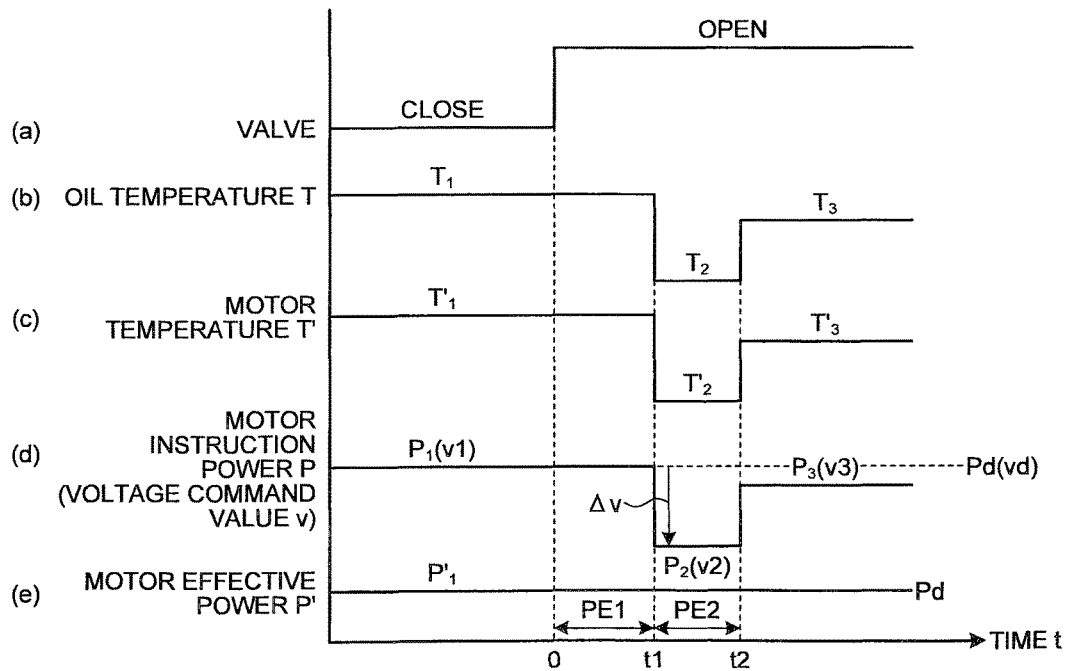

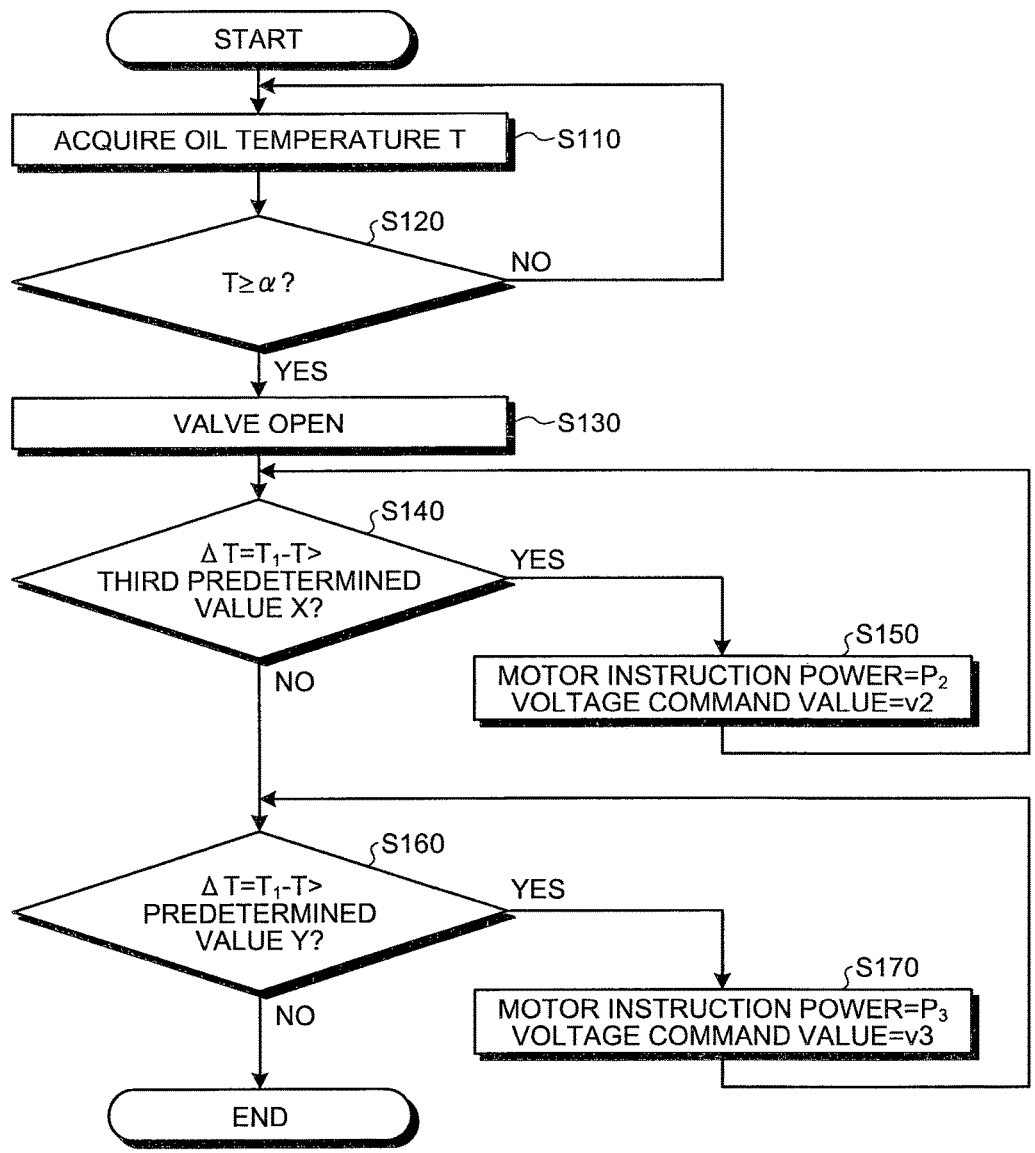

VEHICLE DRIVE DEVICE

TECHNICAL FIELD

The present invention relates to a vehicle drive device.

BACKGROUND ART

A vehicle including an oil cooler and a bypass oil passage that circumvents the oil cooler is conventionally known. For example, Patent Literature 1 discloses an oil temperature control device of a vehicle in which an oil passage connecting an ATF cooler with a warmer function and the ATF cooler includes a bypass oil passage that circumvents the ATF cooler, and a switching control valve that selectively switches oil passages based on a control signal output from a control unit is arranged at a branched portion of the oil passage and the bypass passage.

The control unit of Patent Literature 1 determines whether or not the oil temperature of an automatic fluid discharged from the ATF cooler with the warmer function reached a set temperature set in advance, and outputs a control signal for communicating the ATF cooler with the warmer function and the ATF cooler if the oil temperature reached the set temperature set in advance and outputs a control signal for communicating the ATF cooler with the warmer function and the bypass oil passage if the oil temperature has not reached the set temperature set in advance.

CITATION LIST

Patent Literature

Patent Literature 1: Japanese Patent Application Laid-open No. 2006-207606

DISCLOSURE OF INVENTION

Problems to be Solved by the Invention

Even if the circulating oil has an appropriate temperature, the oil stored in the oil cooler has a low temperature. Thus, when the oil starts to circulate through the oil cooler, the low temperature oil stored in the oil cooler flows out. In a vehicle drive device including an electric motor, when the low temperature oil stored in the oil cooler is supplied and the temperature of the electric motor changes rapidly, the output of the electric motor may fluctuate and the drivability may lower.

It is an object of the present invention to provide a vehicle drive device capable of suppressing the output fluctuation of the electric motor.

Solutions to the Problems

A vehicle drive device according to the present invention includes an oil pump configured to supply oil to an electric motor and a differential gear through an oil passage; an oil cooler that is arranged on the oil passage and configured to cool the oil; a bypass oil passage configured to bypass the oil cooler; a control valve configured to be switched between a first state of regulating the oil from flowing through the oil cooler and a second state of letting the oil flow to the oil cooler; and a control unit, wherein the control unit keeps the control valve in the first state while a temperature of the oil circulated by the oil pump is lower than a predetermined value, and switches the control valve to the second state when the temperature of the oil circulated by the oil pump becomes not lower than the predetermined value while the control valve is in the first state, and the control unit changes a voltage command value of the electric motor to a value smaller than a voltage command value corresponding to a required output of the electric motor after elapse of a predetermined period from a time the control valve is switched to the second state.

In the vehicle drive device, it is preferable that the predetermined period is the duration defined in advance based on a length of the oil passage from a downstream side connecting portion of the oil passage and the bypass oil passage to the electric motor.

In the vehicle drive device, it is preferable to include an oil temperature sensor configured to detect a temperature of the oil supplied from the oil passage to the electric motor, wherein the predetermined period is the duration from a time the control valve is switched to the second state until the temperature of the oil detected by the oil temperature sensor becomes not higher than a second predetermined value.

In the vehicle drive device; it is preferable to include an oil temperature sensor configured to detect a temperature of the oil supplied from the oil passage to the electric motor, wherein the predetermined period is the duration from a time the control valve is switched to the second state until a decreasing amount of the temperature of the oil detected by the oil temperature sensor becomes greater than a third predetermined value, or from a time the control valve is switched to the second state until a decreasing rate of the temperature of the oil detected by the oil temperature sensor becomes greater than a fourth predetermined value.

In the vehicle drive device, it is preferable to include a temperature sensor configured to detect a temperature of the electric motor, wherein the predetermined period is the duration from a time the control valve is switched to the second state until the temperature of the electric motor detected by the temperature sensor becomes not higher than a fifth predetermined value.

In the vehicle drive device, it is preferable that when a second predetermined period has elapsed after the elapse of the predetermined period, the control unit changes the voltage command value to a voltage value greater than the voltage value in the second predetermined period.

Effects of the Invention

The control unit of the vehicle drive device according to the present invention changes the voltage command value of the electric motor to a value smaller than the voltage command value corresponding to the required output of the electric motor after elapse of a predetermined period from a time the control valve is switched to the second state. Thus, the divergence of the actual output of the electric motor with respect to the required output that occurs when the low temperature oil stored in the oil cooler is supplied is suppressed. The vehicle drive device according to the present invention has an effect of being able to suppress the output fluctuation of the electric motor.

BRIEF DESCRIPTION OF DRAWINGS

FIG. 4 is a view illustrating an output fluctuation of an electric motor.

FIG. 5 is a timing chart related to the operation of the vehicle drive device of the first embodiment.

FIG. 6 is a flowchart illustrating the operation of a vehicle drive device according to a second embodiment.

DESCRIPTION OF EMBODIMENTS

A vehicle drive device according to embodiments of the present invention will be hereinafter described in detail with reference to the drawings. The present invention is not limited by the embodiments. The configuring elements in the following embodiments include configuring elements that can be easily contrived by those skilled in the art and configuring elements that are substantially the same.

First Embodiment

Figure 1:
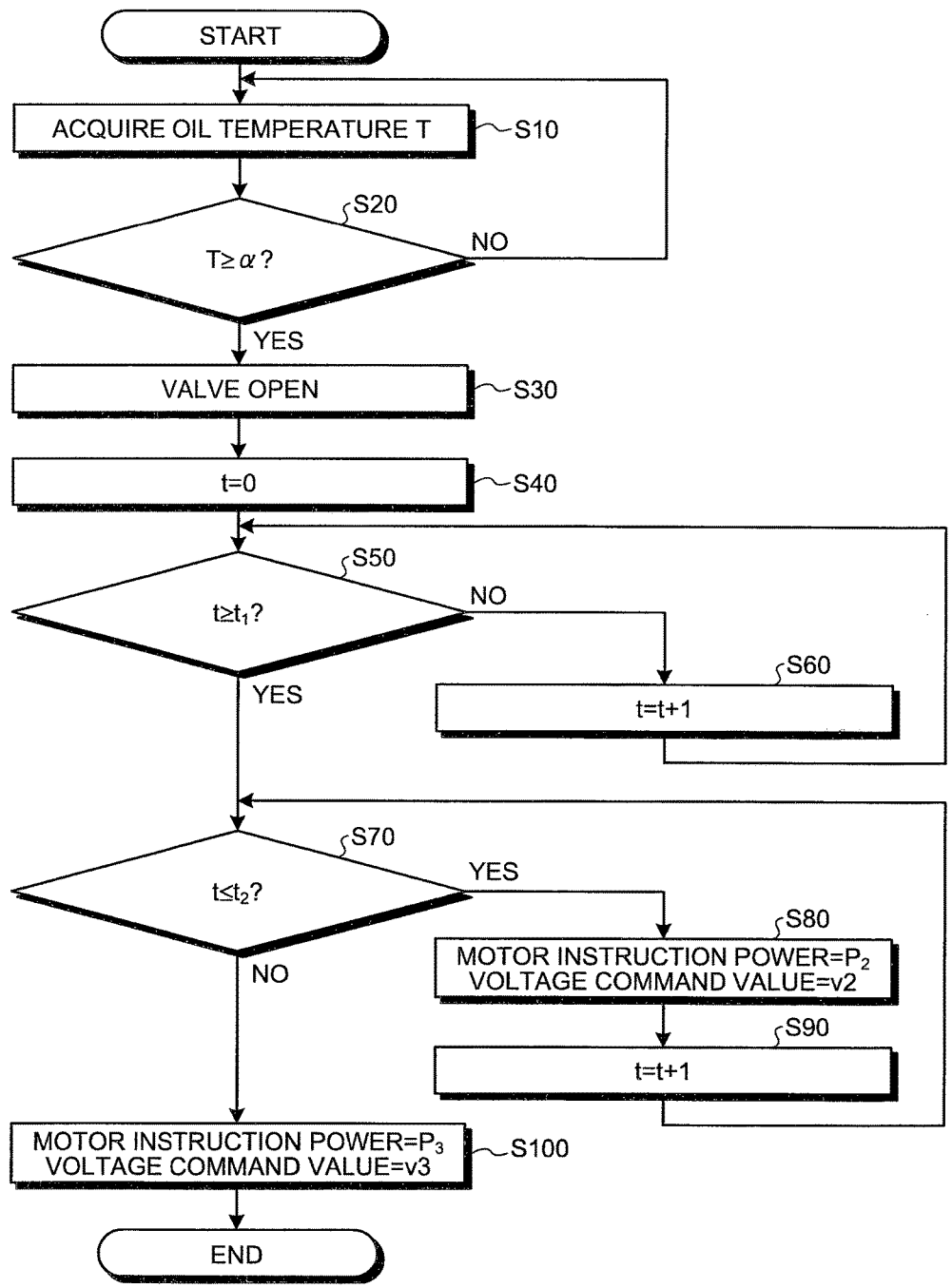
FIG. 1 is a flowchart illustrating an operation of a vehicle drive device according to a first embodiment.

A first embodiment will be described with reference to FIGS. 1 to 5. The present embodiment relates to a vehicle drive device. FIG. 1 is a flowchart illustrating an operation of a vehicle drive device according to a first embodiment of the present invention, FIG. 2 is a schematic configuration diagram of the vehicle drive device according to the first embodiment, FIG. 3 is a view illustrating a state in which a control valve is opened in the vehicle drive device according to the first embodiment, FIG. 4 is a view illustrating an output fluctuation of an electric motor, and FIG. 5 is a timing chart related to the operation of the vehicle drive device of the first embodiment.

Figure 2:
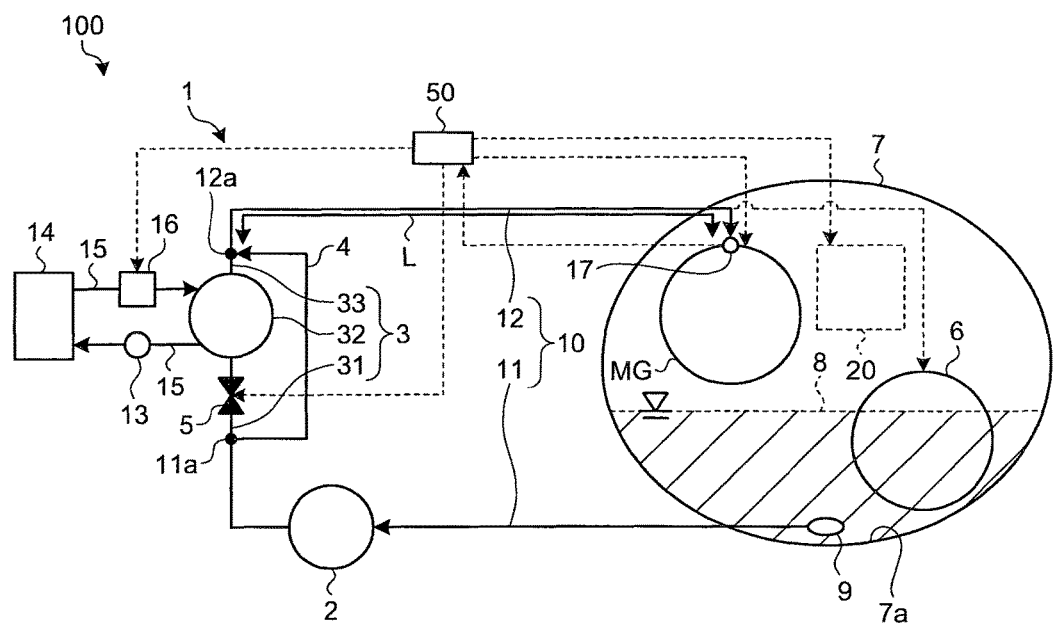
FIG. 2 is a schematic configuration diagram of the vehicle drive device according to the first embodiment.
Figure 3:
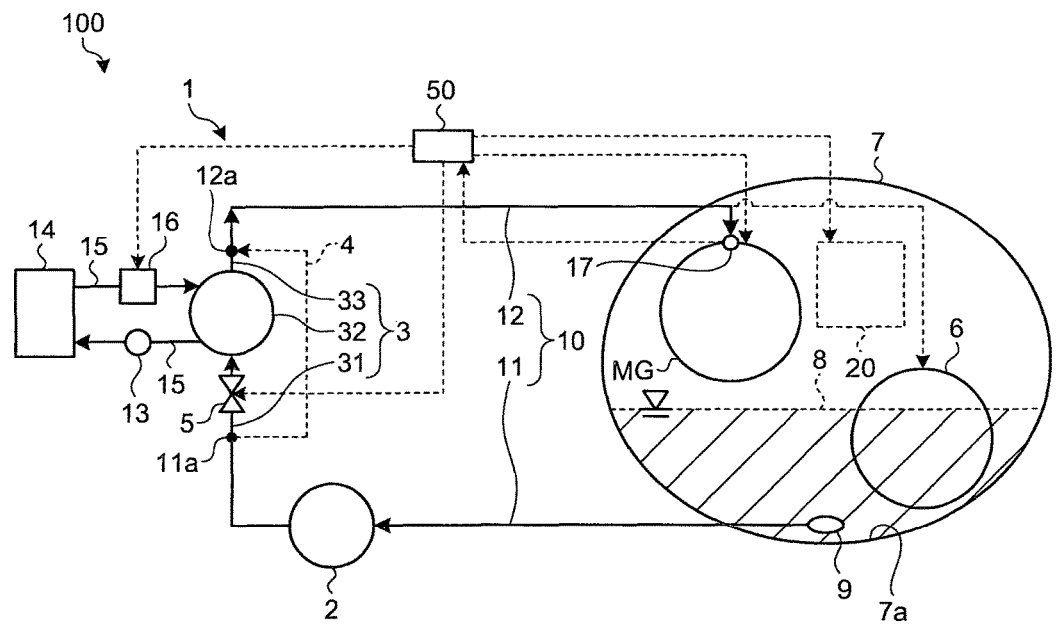
FIG. 3 is a view illustrating a state in which a control valve is opened in the vehicle drive device according to the first embodiment.

A vehicle drive device 1 illustrated in FIG. 2 is a drive device for a hybrid vehicle. A vehicle 100 includes an engine 20 in addition to an electric motor MG as a power source. Torques output from the engine 20 and the electric motor MG are output to a drive wheel of the vehicle 100 through a differential gear 6.

The vehicle drive device 1 of the first embodiment is configured to include an oil pump 2, an oil cooler 3, a bypass oil passage 4, a control valve 5, and an ECU 50. The electric motor MG and the differential gear 6 are arranged in a case 7. The case 7 is a transaxle case. An input shaft, a planetary gear train, a speed reducing mechanism, and the like are further arranged in the case 7. The torque of the engine 20 is input to the input shaft. The planetary gear train functions as a power dividing mechanism that divides the torque of the engine 20, for example. The speed reducing mechanism, for example, reduces the speed of the rotation of the electric motor MG and transmits the same to the differential gear 6.

An oil pan 7a is provided at a lower part of the case 7. Oil 8 is stored in the oil pan 7a. The differential gear 6 is arranged at a lower part of the case 7. It is preferable that at least a part of the differential gear 6 is contact with the oil 8 stored in the oil pan 7a. A strainer 9 is arranged in the oil pan 7a. The strainer 9 is connected to an oil passage 10. The oil passage 10 is configured to include a first oil passage 11 and a second oil passage 12. The first oil passage 11 connects the strainer 9 and the oil cooler 3. The second oil passage 12 connects the oil cooler 3 and the electric motor MG.

The oil pump 2 supplies the oil 8 to the electric motor MG and a gear group including the differential gear 6 through the oil passage 10. The oil pump 2 is arranged on the first oil passage 11. The oil pump 2 sucks the oil 8 of the oil pan 7a through the strainer 9, and discharges the oil 8 toward the electric motor MG and the gear group. The oil pump 2 is, for example, driven by the rotation of the engine 20. The oil pump 2 may be an electrical oil pump.

The oil cooler 3 is a cooling device arranged on the oil passage 10 to cool the oil 8. The oil cooler 3 of the present embodiment is configured to include an inlet oil passage 31, a heat exchanging unit 32, and an outlet oil passage 33. The inlet oil passage 31 connects the first oil passage 11 and the heat exchanging unit 32. The outlet oil passage 33 connects the heat exchanging unit 32 and the second oil passage 12. The heat exchanging unit 32 carries out heat exchange between the oil 8 and the cooling water. The cooling water supplied to the heat exchanging unit 32 is a cooling water of a hybrid system, for example. The vehicle 100 includes a water pump 13, a radiator 14, and a circulating water channel 15. The circulating water channel 15 is a water channel for circulating the cooling water through the water pump 13, the radiator 14, an inverter 16, and the heat exchanging unit 32. The water pump 13 circulates the cooling water through the circulating water channel 15. The radiator 14 cools the cooling water. The inverter 16 controls exchange of power between the electric motor MG and the battery. Specifically, the inverter 16 converts a DC current from the battery to an AC current for driving the electric motor MG. The inverter 16 also converts the AC current generated by the electric motor MG to the DC current for charging the battery. The inverter 16 is cooled by the cooling water supplied through the circulating water channel 15.

The heat exchanging unit 32 carries out heat exchange between the cooling water supplied through the circulating water channel 15 and the oil 8. A heat exchanging oil passage that connects the inlet oil passage 31 and the outlet oil passage 33 is arranged inside the heat exchanging unit 32. A heat exchanging water channel through which the cooling water supplied through the circulating water channel 15 flows is also arranged inside the heat exchanging unit 32. The heat exchange between the oil 8 flowing through the heat exchanging oil passage and the cooling water flowing through the heat exchanging water channel is carried out. If the oil temperature of the oil 8 is higher than the water temperature of the cooling water, the oil 8 is cooled by the heat exchange in the heat exchanging unit 32.

The bypass oil passage 4 bypasses the oil cooler 3. One end of the bypass oil passage 4 is connected to the first oil passage 11, and the other end is connected to the second oil passage 12. In other words, the bypass oil passage 4 connects an upstream side in the flowing direction of the oil 8 than the oil cooler 3 in the oil passage 10 and a downstream side in the flowing direction of the oil 8 than the oil cooler 3 in the oil passage 10. That is, the bypass oil passage 4 is an oil passage that communicates the first oil passage 11 and the second oil passage 12, and guides the oil 8 from the first oil passage 11 to the second oil passage 12 while circumventing the oil cooler 3. A connecting portion 11a of the first oil passage 11 and the bypass oil passage 4 is an upstream side connecting portion of the oil passage 10 and the bypass oil passage 4. A connecting portion 12a of the second oil passage 12 and the bypass oil passage 4 is a downstream side connecting portion of the oil passage 10 and the bypass oil passage 4.

The control valve 5 is switched between a first state of regulating the oil 8 from flowing through the oil cooler 3 and a second state of letting the oil 8 flow to the oil cooler 3. The control valve 5 of the present embodiment is arranged at the inlet oil passage 31. The control valve 5 is an open/close valve, and is switched between a fully-closed state and a fully-opened state. The control valve 5 in the fully-closed state closes the inlet oil passage 31 and disconnects the heat exchanging unit 32 from the first oil passage 11. In other words, the control valve 5 in the fully-closed state prohibits the flow of the oil 8 in the inlet oil passage 31. The fully-closed state of the control valve 5 is the first state of regulating the oil 8 from flowing through the oil cooler 3. The control valve 5 in the fully-opened state, on the other hand, opens the inlet oil passage 31 and communicates the first oil passage 11 and the heat exchanging unit 32. The control valve 5 in the fully-opened state allows the flow of the oil 8 in the inlet oil passage 31, and allows the oil 8 flowing in from the first oil passage 11 to the inlet oil passage 31 to flow into the heat exchanging unit 32. The fully-opened state of the control valve 5 is the second state of letting the oil 8 flow to the oil cooler 3.

The ECU 50 functions as a control unit. The ECU 50 of the present embodiment is an electronic control unit including a computer. The ECU 50 has a function of carrying out travel control of the vehicle 100. The ECU 50 calculates a required power, a required acceleration, a required torque, and the like as required values of the output to be output by the vehicle drive device 1 based on an accelerator opening and a vehicle speed. In the present embodiment, the ECU 50 determines the required output of the electric motor MG and the engine 20 based on the required power to be generated in the vehicle 100. The ECU 50 determines an engine required power to be generated by the engine 20 and a motor required power to be generated by the electric motor MG. The sum of the engine required power and the motor required power is the required power of the vehicle 100.

The ECU 50 determines a motor instruction power P based on the motor required power. The motor instruction power P is a command value related to the electric motor MG for realizing the motor required power. The ECU 50 determines a voltage command value v based on the motor instruction power P. The voltage command value v is a command value of the voltage to be applied to the electric motor MG. The inverter 16 controls a switching element so as to adjust the voltage value to apply to the circuit of the electric motor MG so as to become the voltage command value v. The inverter 16, for example, performs ON/OFF control of the switching element so that an effective value of the voltage to apply to the electric motor MG becomes the voltage command value v by PWM control.

The ECU 50 controls the engine 20 based on the engine required power. The ECU 50 outputs to the engine 20 command values of a throttle opening, a fuel injection amount, an ignition timing, and the like of the engine 20 to realize the engine required power.

The ECU 50 controls the control valve 5. The control valve 5 includes an actuator for driving the valve body to switch to the fully-opened state or the fully-closed state. The actuator switches the fully-closed state and the fully-opened state of the control valve 5 with an electromagnetic force, for example. When a valve closing command is provided from the ECU 50, the control valve 5 is switched to the fully-closed state by the actuator. When a valve opening command is provided from the ECU 50, the control valve 5 is switched to the fully-opened state by the actuator.

The ECU 50 controls the control valve 5 based on the oil temperature of the oil 8. The ECU 50 of the present embodiment controls the control valve 5 so as to regulate the oil 8 from flowing through the oil cooler 3 while the temperature of the oil 8 is lower than a predetermined value. The vehicle drive device 1 includes an oil temperature sensor 17 for detecting the temperature of the oil 8 supplied from the oil passage 10 to the electric motor MG. The oil temperature sensor 17 of the present embodiment is arranged at a flow-out port of the second oil passage 12. The flow-out port of the second oil passage 12 is connected to an upper part of the electric motor MG, for example, an upper part of the case of the stator. The oil 8 that flows out from the flow-out port of the second oil passage 12 runs down after cooling the stator and the rotor of the electric motor MG, and is stored in the oil pan 7a. The oil temperature sensor 17 detects the temperature of the oil 8 supplied from the second oil passage 12 to the electric motor MG.

The ECU 50 causes the control valve 5 to be in the first state (fully-closed state in the present embodiment) while the temperature of the oil 8 circulated through the oil passage 10 by the oil pump 2 is lower than a predetermined value, and causes the control valve 5 to be in the second state (fully-opened state in the present embodiment) when the temperature of the oil 8 circulated through the oil passage 10 by the oil pump 2 becomes higher than or equal to the predetermined value while the control valve 5 is in the first state. The ECU 50 of the present embodiment switches the first state and the second state of the control valve 5 based on the oil temperature detected by the oil temperature sensor 17. For example, the ECU 50 causes the control valve 5 to be in the fully-closed state when the oil temperature of the oil 8 detected by the oil temperature sensor 17 at the start of the hybrid system is lower than the predetermined value, and maintains the control valve 5 in the fully-closed state while the oil temperature is not higher than or equal to the predetermined value. Therefore, while the oil temperature of the oil 8 detected by the oil temperature sensor 17 at the cold start is lower than the predetermined value, the control valve 5 is held in the fully-closed state and the oil 8 is regulated from flowing through the oil cooler 3. The ECU 50 switches the control valve 5 to the fully-opened state so that the oil 8 flows through the oil cooler 3 when the oil temperature detected by the oil temperature sensor 17 becomes higher than or equal to the predetermined value. The predetermined value is, for example, defined from a standpoint of suppressing the lowering in the efficiency of the electric motor MG due to the temperature rise, a standpoint of suppressing the degradation of the oil 8, and the like.

When the oil temperature becomes higher than or equal to the predetermined value, the ECU 50 switches the control valve 5 from the fully-closed state to the fully-opened state. The oil 8 thereby flows from the first oil passage 11 to the second oil passage 12 through the oil cooler 3, so that the oil 8 of high temperature is cooled. When the oil temperature detected by the oil temperature sensor 17 becomes lower than or equal to a valve-closing temperature, the ECU 50 switches the control valve 5 from the fully-opened state to the fully-closed state. The valve-closing temperature is a temperature lower than the predetermined value. The valve-closing temperature is, for example, defined from a standpoint of suppressing increase in loss such as agitation loss of the differential gear 6 caused by the lowering of the oil temperature, and the like.

The oil cooler 3 functions as a storage unit for storing the oil 8 when the control valve 5 is closed. When the control valve 5 is closed, the oil 8 flows from the first oil passage 11 to the second oil passage 12 through the bypass oil passage 4. The oil 8 in the oil cooler 3 is retained in the oil cooler 3 without circulating through the oil passage 10, and the like. Thus, the substantial heat capacity of the oil 8 circulating the vehicle drive device 1 becomes small, and the temperature rise of the oil 8 is promoted. As the temperature rise of the oil 8 is promoted and the agitation loss of the differential gear 6 is reduced at an early stage, the fuel efficiency is enhanced.

As the temperature of the oil 8 is raised and the control valve 5 is opened, the oil 8 stored in the oil cooler 3 is added to the oil 8 circulating the vehicle drive device 1. The amount of the oil 8 circulating the vehicle drive device 1 thus increases and the substantial heat capacity of the oil 8 increases. The temperature rise of the oil 8 is thereby suppressed.

FIG. 2 illustrates the flow of the oil 8 of when the control valve 5 is in the fully-closed state. When the control valve 5 is in the fully-closed state, the oil 8 fed by the oil pump 2 flows from the first oil passage 11 to the second oil passage 12 through the bypass oil passage 4, as illustrated in FIG. 2. As the control valve 5 is closed, the inlet oil passage 31 is blocked. Therefore, the oil 8 is regulated from flowing through the oil cooler 3. The oil 8 that flowed in from the bypass oil passage 4 to the second oil passage 12 is supplied to the upper part of the electric motor MG and cools the electric motor MG. The oil 8 that cooled the electric motor MG is stored in the oil pan 7a of the case 7, and sucked by the oil pump 2 through the strainer 9. The oil 8 stored in the oil pan 7a lubricates the differential gear 6. When the control valve 5 is in the fully-closed state, the oil 8 stored in the heat exchanging unit 32 is in a non-temperature rising state, and thus has a lower temperature compared to the oil 8 circulating through the oil passage 10.

FIG. 3 illustrates the flow of the oil 8 of when the control valve 5 is in the fully-opened state. When the control valve 5 is in the fully-opened state, the oil 8 fed by the oil pump 2 is allowed to flow into the inlet oil passage 31 from the first oil passage 11, as illustrated in FIG. 3. The oil 8 that flowed into the inlet oil passage 31 flows into the heat exchanging unit 32 so as to be cooled by the heat exchange with the cooling water. The cooled oil 8 flows into the second oil passage 12 from the heat exchanging unit 32 through the outlet oil passage 33. When the control valve 5 is in the fully-opened state, the oil 8 is also allowed to flow through the bypass oil passage 4. In other words, a part of the oil 8 fed by the oil pump 2 may flow from the first oil passage 11 to the second oil passage 12 through the oil cooler 3, and a remaining part of the oil 8 may flow from the first oil passage 11 to the second oil passage 12 through the bypass oil passage 4.

When the control valve 5 is opened in accordance with the temperature rise of the oil 8 circulated by the oil pump 2, the oil 8 of low temperature stored in the oil cooler 3 is supplied from the second oil passage 12 to the electric motor MG. Thus, a problem in that the output fluctuation of the electric motor MG occurs arises, as described below with reference to FIG. 4. FIG. 4 illustrates (a) open/close state of the control valve 5, (b) oil temperature T, (c) motor temperature T', (d) motor instruction power P, and (e) motor effective power P'. The oil temperature T is the temperature of the oil 8 supplied from the second oil passage 12 to the electric motor MG. The motor temperature T' is the temperature of the electric motor MG, and is the temperature of the stator, for example. The motor effective power P' is the value of the power actually output by the electric motor MG.

In FIG. 4, the motor instruction power P is set to the same value ($P_1$=Pd) as the required output Pd (motor required power) of the electric motor MG.

In FIG. 4, the control valve 5 is opened at time 0 based on the temperature of the oil 8 circulated by the oil pump 2. The oil 8 stored in the oil cooler 3 then flows out to the second oil passage 12 and starts to flow toward the electric motor MG. At time t01, the oil 8 that flowed out from the oil cooler 3 reaches the electric motor MG, and starts to be supplied to the electric motor MG. The oil temperature T thus rapidly lowers at time t01. The motor temperature T' also lowers with the lowering of the oil temperature T. When the motor temperature T' lowers, a resistance value of a copper wire portion of the electric motor MG lowers. Consequently, the current value that actually flows to the electric motor MG increases even if the motor instruction power P is the same value $P_1$ (voltage command value v of the electric motor MG is the same voltage value v1). In other words, even with the same voltage command value v, the current value that actually flows to the circuit of the electric motor MG increases, and the current exceeding the target value flows to the electric motor MG. As a result, divergence occurs between a value $P'_2$ of the motor effective power P' after time t01 and the required output Pd of the electric motor MG. The motor effective power P' increases at time t01, and shock may possibly occur in the vehicle 100 due to the torque fluctuation.

To deal with this problem, the ECU 50 of the vehicle drive device 1 according to the present embodiment corrects the voltage command value v of the electric motor MG to a small voltage command value (v2) on the low torque side than a voltage command value (vd) corresponding to the required output Pd of the electric motor MG after elapse of a predetermined period PE1 from a time the control valve 5 is switched to the second state, as will be described below with reference to FIG. 5. The voltage command value (v2) of after the correction of the present embodiment is a voltage value that suppresses the divergence between the required output (Pd) and the actual output (P') of the electric motor MG than the voltage command value (vd) of when the correction is not made, the divergence which occurs when the oil 8 stored in the oil cooler 3 is supplied to the electric motor MG. The ECU 50 stores a map indicating a correspondence relationship of the motor instruction power P and the voltage command value vd, for example, and determines the voltage command value vd from the motor instruction power P based on the map. According to the map, for example, the voltage command value vd increases in correspondence with the increase in the motor instruction power P, and the voltage command value vd decreases in accordance with the reduction in the motor instruction power P. The voltage command value vd based on the map is output to the electric motor MG until elapse of the predetermined period PE1. After the elapse of the predetermined period PE1, the voltage command value v2 of after the correction is output to the electric motor MG in place of the voltage command value vd based on the map.

The predetermined period PE1 is, for example, a required time from a time the control valve 5 is opened until the oil 8 stored in the oil cooler 3 reaches the electric motor MG. According to the vehicle drive device 1 of the present embodiment, when the oil 8 of low temperature stored in the oil cooler 3 reaches the electric motor MG, the voltage command value v is corrected to the voltage value smaller than the voltage command value vd corresponding to the required output Pd. The voltage command value (v2) of after the correction is a voltage smaller than the voltage command value vd based on the map. The torque fluctuation is thereby suppressed, and the drivability is enhanced.

FIG. 5 illustrates the motor instruction power P, the voltage command value v, and the motor effective power P' of when the motor required power (required output Pd) is transitioned at a constant value. The predetermined period PE1 of the present embodiment is the duration from time 0 at which the control valve 5 is opened to time t1 at which the oil temperature T of the oil 8 making contact with the electric motor MG lowers. The predetermined period PE1 is the duration defined in advance based on a length L (see FIG. 2) of the oil passage 10 from the downstream side connecting portion 12a of the oil passage 10 and the bypass oil passage 4 to the electric motor MG, for example. The required time until the oil 8 flowing out from the oil cooler 3 flows from the connecting portion 12a through the second oil passage 12 and reaches the electric motor MG can be calculated based on the length L. The predetermined period PE1 is, for example, the required time.

The ECU 50 corrects the motor instruction power P from an instruction power $P_1$ up to the relevant point to an instruction power $P_2$ at time t1, at which the predetermined period PE1 has elapsed. The instruction power $P_2$ of after the correction is a value on the low torque side than the instruction power $P_1$ of before the correction, that is, the value on the low torque side than the required output Pd. The ECU 50 also corrects the voltage command value v according to the correction of the motor instruction power P. The voltage command value v2 of after the correction is a value on the low torque side than the voltage command value v1 of before the correction, that is, the voltage command value vd corresponding to the required output Pd. The magnitude of the voltage command value v2 of after the correction is smaller than the magnitude of the voltage command value vd corresponding to the required output Pd. The divergence of the required output Pd and the motor effective power P' is suppressed by correcting the voltage command value v to the voltage value on the low torque side. In the present embodiment, the voltage command value v is corrected to suppress the divergence of the required output Pd and the motor effective power P' that occurs when the oil 8 of low temperature that flowed out from the oil cooler 3 is supplied to the electric motor MG. The correction amount of the voltage command value v is preferably a value that does not diverge the motor effective power P' from the required output Pd. For example, the voltage command value v2 of after the correction is preferably a value that coincides the motor effective power P' to the required output Pd.

The operation of the vehicle drive device 1 of the first embodiment will be described with reference to FIG. 1. The control flow illustrated in FIG. 1 is executed while the oil pump 2 is circulating the oil 8, for example.

In step S10, the oil temperature T is acquired by the ECU 50. For example, the ECU 50 acquires the oil temperature of the oil 8 from the oil temperature sensor 17. After step S10 is executed, the process proceeds to step S20.

In step S20, whether or not the oil temperature T is higher than or equal to a predetermined value α is determined by the ECU 50. The predetermined value α is a threshold oil temperature for switching the first state and the second state of the control valve 5. As a result of the determination of step S20, the process proceeds to step S30 if determined that the oil temperature T is higher than or equal to the predetermined value α (step S20-Y), and the process proceed to step S10 in the opposite case (step S20-N).

In step S30, the valve opening command is issued by the ECU 50. The ECU 50 outputs the valve opening command to the control valve 5. The control valve 5 is opened in response to the valve opening command to be in the second state of communicating the first oil passage 11 and the heat exchanging unit 32. After step S30 is executed, the process proceeds to step S40.

In step S40, a timer value t is set to 0 by the ECU 50. The timer value t is a value that counts the elapsed time from a time the control valve 5 is opened and switched to the second state. After step S40 is executed, the process proceeds to step S50.

In step S50, whether or not the timer value t is greater than or equal to a first timer value t1 is determined by the ECU 50. The first timer value t1 is a threshold value for determining the elapse of the predetermined period PE1. If the timer value t is greater than or equal to the first timer value t1, determination is made that the predetermined period PE1 has elapsed. The first timer value t1 may be defined in advance, for example, based on the capacity of the second oil passage 12 and the discharging ability of the oil pump 2. As a result of the determination of step S50, the process proceeds to step S70 if determined that the timer value t is greater than or equal to the first timer value t1 (step S50-Y) and the process proceeds to step S60 in the opposite case (step S50-N).

In step S60, the timer value t is counted up by the ECU 50. The ECU 50 increments the timer value t, and increases the timer value t by one. After step S60 is executed, the process proceeds to step S50.

In step S70, whether or not the timer value t is smaller than or equal to a second timer value t2 is determined by the ECU 50. The second timer value t2 is a threshold value for determining whether or not all of the oil 8 stored in the oil cooler 3 has flowed out from the second oil passage 12 toward the electric motor MG. If the timer value t is smaller than or equal to the second timer value t2, determination is made that the oil 8 stored in the oil cooler 3 is still being supplied to the electric motor MG. The second timer value t2 is, for example, defined based on the capacity of the oil 8 stored in the oil cooler 3 and the discharging ability of the oil pump 2.

In the present specification, the duration from a time the predetermined period PE1 has elapsed until the oil 8 stored in the oil cooler 3 all flows out from the second oil passage 12 is referred to as a "second predetermined period PE2". In FIG. 5, the second predetermined period PE2 is from time t1 to time t2. In step S70, whether or not the second predetermined period PE2 has elapsed is determined. If the timer value t is greater than the second timer value t2, determination is made that the second predetermined period PE2 has elapsed. As a result of the determination of step S70, the process proceeds to step S80 if determined that the timer value t is smaller than or equal t0 the second timer value t2 (step S70-Y), and the process proceeds to step S100 in the opposite case (step S70-N).

In step S80, the motor instruction power P and the voltage command value v are corrected by the ECU 50. The ECU 50 corrects the value of the motor instruction power P from the instruction power $P_1$ corresponding to the required output Pd to the instruction power $P_2$ of after the correction. The ECU 50 also corrects the voltage command value v according to the correction of the motor instruction power P. The voltage command value v2 of after the correction is, for example, the voltage value on the low torque side by a predetermined amount or a predetermined proportion with respect to the voltage command value vd corresponding to the required output Pd. A correction amount Δv of the voltage command value v is determined based on the temperature properties of the electric motor MG, for example. By way of example, the correction amount Δv is defined based on a correspondence relationship of the decreasing amount of the oil temperature T in the electric motor MG and the increasing amount (or increasing rate) of the motor effective power P'. In FIG. 5, the oil temperature T decreases from $T_1$ to $T_2$ at time t1 when the oil 8 stored in the oil cooler 3 reaches the electric motor MG. The increasing amount of the motor effective power P' corresponding to the lowering of the oil temperature is assumed as ΔP1 with respect to the same voltage command value v. In this case, the output fluctuation of the electric motor MG is suitably suppressed by correcting the voltage command value v to the voltage value on the low torque side by the amount of the voltage value corresponding to the increasing amount ΔP1. The increasing rate of the motor effective power P' by the lowering of the oil temperature is assumed as ΔP2 with respect to the same voltage command value v. In this case, the output fluctuation of the electric motor MG is suitably suppressed by correcting the voltage command value v to the voltage value on the low torque side by the amount of the voltage value corresponding to the increasing rate ΔP2.

Rather than being calculated in accordance with the required output Pd and the correction amount Δv, the instruction power $P_2$ of after the correction may be calculated based on the map and the like from the required output Pd without calculating the correction amount Δv. For example, a map indicating the correspondence relationship of the required output Pd and the instruction power $P_2$ of after the correction may be stored, and such map may be referred to for determining the instruction power $P_2$ of after the correction. This is similar for the voltage command value v. The voltage command value v2 of after the correction may be determined based on a map indicating a correspondence relationship of the voltage command value vd corresponding to the required output Pd and the voltage command value v2 of after the correction without calculating the correction amount Δv.

Alternatively, the instruction power $P_2$ of after the correction may be determined regardless of the required output Pd. In other words, the instruction power $P_2$ of after the correction may be the same value regardless of the value of the required output Pd. For example, the same value may always be used for the instruction power $P_2$ of after the correction in the travelling region of light load. This is similar for the voltage command value v. It is desirable the correction of the motor instruction power P and the voltage command value v at least suppresses the divergence of the required output Pd and the motor effective power P' compared to when the correction is not made by the relevant correction. The ECU 50 may correct only the voltage command value v without correcting the motor instruction power P. After the correction of the motor instruction power P and the correction of the voltage command value v are carried out in step S80, the process proceeds to step S90.

In step S90, the timer value t is counted up by the ECU 50. The ECU 50 increments the timer value t and increases the timer value t by one. After step S90 is executed, the process proceeds to step S70.

In step S100, the motor instruction power P is corrected by the ECU 50. After the oil 8 stored in the oil cooler 3 all flowed out from the second oil passage 12 to the electric motor MG at time t2, the oil temperature T rises. An oil temperature $T_3$ after the rise is lower than an oil temperature $T_1$ of before the control valve 5 is opened. This is because the oil 8 is cooled by the oil cooler 3. The oil temperature $T_3$ is higher than an oil temperature $T_2$ of the second predetermined period PE2, that is, an oil temperature of while the oil 8 stored in the oil cooler 3 is being supplied to the electric motor MG. The ECU 50 corrects the motor instruction power P and the voltage command value v according to the oil temperature $T_3$ of after the elapse of the second predetermined period PE2. A value $P_3$ of the motor instruction power P of after the elapse of the second predetermined period PE2 is a value on the low torque side than the required output Pd, and is a value on the high torque side than the instruction power $P_2$ of the second predetermined period PE2.

A value v3 of the voltage command value v of after the elapse of the second predetermined period PE2 is a voltage value on the low torque side than the voltage command value vd corresponding to the required output Pd, and is a voltage value on the high torque side than the voltage command value v2 of the second predetermined period PE2. That is, when the second predetermined period PE2 has elapsed after the elapse of the predetermined period PE1, the ECU 50 changes the voltage command value v to the voltage value on the high torque side than the voltage command value v2 in the second predetermined period PE2. The voltage command value v3 in this case is a voltage value at which the divergence of the required output Pd and the motor effective power P' becomes smaller than either of the voltage command value vd corresponding to the required output Pd and the voltage command value v2 of the second predetermined period PE2. The voltage command value v3 is preferably the voltage value at which the divergence of the required output Pd and the motor effective power P' does not occur. After step S100 is executed, the present control flow is terminated.

As described above, the ECU 50 of the present embodiment corrects the voltage command value v to the voltage value (voltage command value v2) on the low torque side than the voltage value (voltage command value vd) corresponding to the required output Pd of the electric motor MG at the timing the oil 8 stored in the oil cooler 3 reaches the electric motor MG. The voltage value (voltage command value vd) corresponding to the required output Pd is, for example, the voltage value that suitably realizes the required output Pd at the oil temperature $T_1$ of when the control valve 5 is opened. The voltage command value v2 of after the correction is, for example, the voltage value that suitably realizes the required output Pd at the oil temperature $T_2$ of while the oil 8 stored in the oil cooler 3 is being supplied to the electric motor MG. The correction amount Δv of the voltage command value v may vary according to the temperature of the oil 8 stored in the oil cooler 3. For example, if the temperature of the oil 8 stored in the oil cooler 3 is low, the magnitude of the correction amount Δv of the voltage command value v is increased so that the voltage command value v2 of after the correction becomes the voltage value more on the low torque side than when the temperature of the oil 8 stored in the oil cooler 3 is high. The temperature of the oil 8 stored in the oil cooler 3 can be calculated, for example, from the temperature of the cooling water supplied to the heat exchanging unit 32.

The voltage command value v2 of after the correction is the voltage value that suppresses the occurrence of divergence between the required output Pd and the actual output (motor effective power P') of the electric motor MG by the supply of the oil 8 stored in the oil cooler 3 to the electric motor MG more than the voltage command value vd of when the correction is not made. Thus, according to the vehicle drive device 1 of the present embodiment, the output fluctuation of the electric motor MG of when the oil 8 of low temperature stored in the oil cooler 3 reaches the electric motor MG can be suppressed.

In the present embodiment, the elapse of the predetermined period PE1 is determined based on the timer value t. In this case, the voltage command value v can be corrected in a feed forward manner in synchronization with the change in the oil temperature T. The optimum correction start timing of the voltage command value v that does not cause torque fluctuation can be set in advance based on the result of adaptive experiments, and the like.

Second Embodiment

A second embodiment will now be described with reference to FIG. 6. In the second embodiment, the same reference numerals are denoted on the configuring elements having functions similar to those described in the first embodiment, and the redundant description will be omitted. FIG. 6 is a flowchart illustrating the operation of a vehicle drive device according to the second embodiment. The second embodiment differs from the first embodiment in that the elapse of the predetermined period PE1 is determined based on the oil temperature T detected by the oil temperature sensor 17.

The control flow illustrated in FIG. 6 is executed while the oil pump 2 is circulating the oil 8, for example. In step S110, the ECU 50 acquires the oil temperature T, and in step S120, the ECU 50 determines whether or not the acquired oil temperature T is higher than or equal to a predetermined value α. As a result of the determination, the process proceeds to step S130 if the oil temperature T is higher than or equal to the predetermined value α and proceeds to step S110 in the opposite case.

In step S130, the valve opening command is issued by the ECU 50. The ECU 50 outputs the valve opening command to the control valve 5. The control valve 5 is opened in response to the valve opening command and communicates the first oil passage 11 and the heat exchanging unit 32. After step S130 is executed, the process proceeds to step S140.

In step S140, whether or not an oil temperature decreasing amount ΔT is greater than a third predetermined value X is determined by the ECU 50. In step S140, whether or not the predetermined period PE1 has elapsed is determined. The third predetermined value X is a threshold value for determining whether the predetermined period PE1 has elapsed and whether the second predetermined period PE2 is continuing. The predetermined period PE1 of the present embodiment is the duration from a time the control valve 5 is switched to the second state until the decreasing amount of the temperature of the oil 8 detected by the oil temperature sensor 17 becomes greater than the third predetermined value X. The oil temperature decreasing amount ΔT is calculated with the following equation (1). The oil temperature $T_1$ is the oil temperature T of when the control valve 5 is opened, and is the oil temperature T immediately before the control valve 5 is opened, for example. The oil temperature T on the right side of equation (1) is the oil temperature T detected by the oil temperature sensor 17, and is newly acquired each time step S140 is executed, for example.

$$\Delta T = T_1 - T \quad (1)$$

While the oil temperature decreasing amount ΔT is greater than the third predetermined value X (step S140-Y), determination is made that the second predetermined period PE2 is continuing. That is, the second predetermined period PE2 is the duration from a time the oil temperature decreasing amount ΔT becomes greater than the third predetermined value X until the oil temperature decreasing amount ΔT becomes smaller than or equal to the third predetermined value X. As a result of the determination of step S140, the process proceeds to step S150 if determined that the oil temperature decreasing amount ΔT is greater than the third predetermined value X (step S140-Y), and proceeds to step S160 in the opposite case (step S140-N).

In step S150, the motor instruction power P is corrected from the instruction power $P_1$ corresponding to the required output Pd to the instruction power $P_2$ of after the correction by the ECU 50. For example, the ECU 50 corrects the motor instruction power P and the voltage command value v, similar to step S80 of the first embodiment. After step S150 is executed, the process proceeds to step S140.

In step S160, whether or not the oil temperature decreasing amount ΔT is greater than a predetermined value Y is determined by the ECU 50. In step S160, whether or not the oil 8 stored in the oil cooler 3 all flowed out from the second oil passage 12 and the oil 8 that flowed from the first oil passage 11 through the oil cooler 3 is supplied to the electric motor MG is determined by the ECU 50. In FIG. 5, the oil 8 stored in the oil cooler 3 all flows out from the second oil passage 12 at time t2. The oil temperature T thus rises. The oil temperature $T_3$ after the rise is the value of the oil temperature T of the oil 8 supplied from the first oil passage 11 to the electric motor MG through the oil cooler 3, and is lower than the oil temperature $T_1$ of before the control valve 5 is opened. If the value of the oil temperature T is $T_3$, the oil temperature decreasing amount ΔT satisfies the following equation (2). The predetermined value Y of step S160 is a value smaller than the third predetermined value X of step S140. The third predetermined value X and the predetermined value Y are positive values, respectively.

$$Y < \Delta T \leq X \quad (2)$$

That is, in step S160, whether or not the second predetermined period PE2 has elapsed and the cooled oil 8 that passed the oil cooler 3 is supplied to the electric motor MG is determined. When the oil temperature is raised and the oil temperature decreasing amount ΔT becomes smaller than or equal to the predetermined value Y, that is, when the correction of the motor instruction power P and the voltage command value v based on the oil temperature T becomes unnecessary such as when the control valve 5 is closed, negative determination is made in step S160. As a result of the determination of step S160, the process proceeds to step S170 if determined that the oil temperature decreasing amount ΔT is greater than the predetermined value Y (step S160-Y), and the present control flow is terminated in the opposite case (step S160-N).

In step S170, the motor instruction power P is corrected to the value $P_3$ of the motor instruction power P of after elapse of the second predetermined period PE2 by the ECU 50. For example, the ECU 50 corrects the motor instruction power P and the voltage command value v, similar to step S100 of the first embodiment. After step S170 is executed, the process proceeds to step S160.

As described above, according to the present embodiment, the elapse of the predetermined period PE1 and the elapse of the second predetermined period PE2 are determined based on the detected oil temperature T. In the control flow illustrated in FIG. 6, the predetermined period PE1 is the duration from a time the control valve 5 is switched to the second state until the decreasing amount (oil temperature decreasing amount ΔT) of the temperature of the oil 8 detected by the oil temperature sensor 17 becomes greater than the third predetermined value X. The elapse of the predetermined period PE1 and the second predetermined period PE2 is determined based on the actual temperature of the oil 8 supplied to the electric motor MG, so that the deviation of timing between the timing the oil temperature T lowers and the timing to start the correction of the voltage command value v is suppressed.

In determining the elapse of the predetermined period PE1, the determination based on the value of the oil temperature T itself instead of the oil temperature decreasing amount ΔT may be made. For example, determination may be made that the predetermined period PE1 elapsed when the temperature of the oil 8 detected by the oil temperature sensor 17 becomes lower than or equal to the second predetermined value. In this case, the predetermined period PE1 is the duration from a time the control valve 5 is switched to the second state until the temperature of the oil 8 detected by the oil temperature sensor 17 becomes lower than or equal to the second predetermined value. The second predetermined value is preferably lower than the oil temperature T of immediately before the control valve 5 is switched to the second state and higher than the temperature of the oil 8 stored in the oil cooler 3. The second predetermined value is a value that can suitably suppress the divergence between the required output Pd of the electric motor MG and the motor effective power P'. The second predetermined value is preferably defined based on the adaptive experiments, and the like so that determination can be made accurately and at as an early timing as possible that the oil 8 stored in the oil cooler 3 reached the electric motor MG.

In determining the elapse of the predetermined period PE1, determination based on the decreasing rate of the oil temperature T instead of the oil temperature decreasing amount ΔT may be made. The decreasing rate of the oil temperature T is the oil temperature decreasing amount ΔT per unit time, for example. In this determination method, for example, determination is made that the predetermined period PE1 elapsed when the decreasing rate of the temperature of the oil 8 detected by the oil temperature sensor 17 becomes greater than a fourth predetermined value X1. In this case, the predetermined period PE1 is the duration from a time the control valve 5 is switched to the second state until the decreasing rate of the temperature of the oil 8 detected by the oil temperature sensor 17 becomes greater than the fourth predetermined value X1. When the oil 8 stored in the oil cooler 3 reaches the electric motor MG, the oil temperature T rapidly lowers. The timing of fall of the oil temperature T (time t1 of FIG. 5) can be detected by the decreasing rate of the temperature of the oil 8. The fourth predetermined value X1 is, for example, a value of a decreasing rate greater than the decreasing rate of the oil temperature T that may occur when the control valve 5 is in the first state. The fourth predetermined value X1 is preferably defined based on the adaptive experiments, and the like so that determination can be made accurately and at as an early timing as possible that the oil 8 stored in the oil cooler 3 reached the electric motor MG. The fourth predetermined value X1 of the determination based on the decreasing rate of the oil temperature T is preferably a value different from the third predetermined value X of the determination based on the oil temperature decreasing amount ΔT.

The elapse of the second predetermined period PE2 may be determined based on the rising rate of the oil temperature T. When the rising rate of the oil temperature T becomes greater than a predetermined rising rate after elapse of the predetermined period PE1, determination is made that the second predetermined period PE2 has elapsed. In this case, the second predetermined period PE2 is the duration from a time the predetermined period PE1 has elapsed until the rising rate of the oil temperature T becomes greater than the predetermined rising rate.

Third Embodiment

Figure 7:
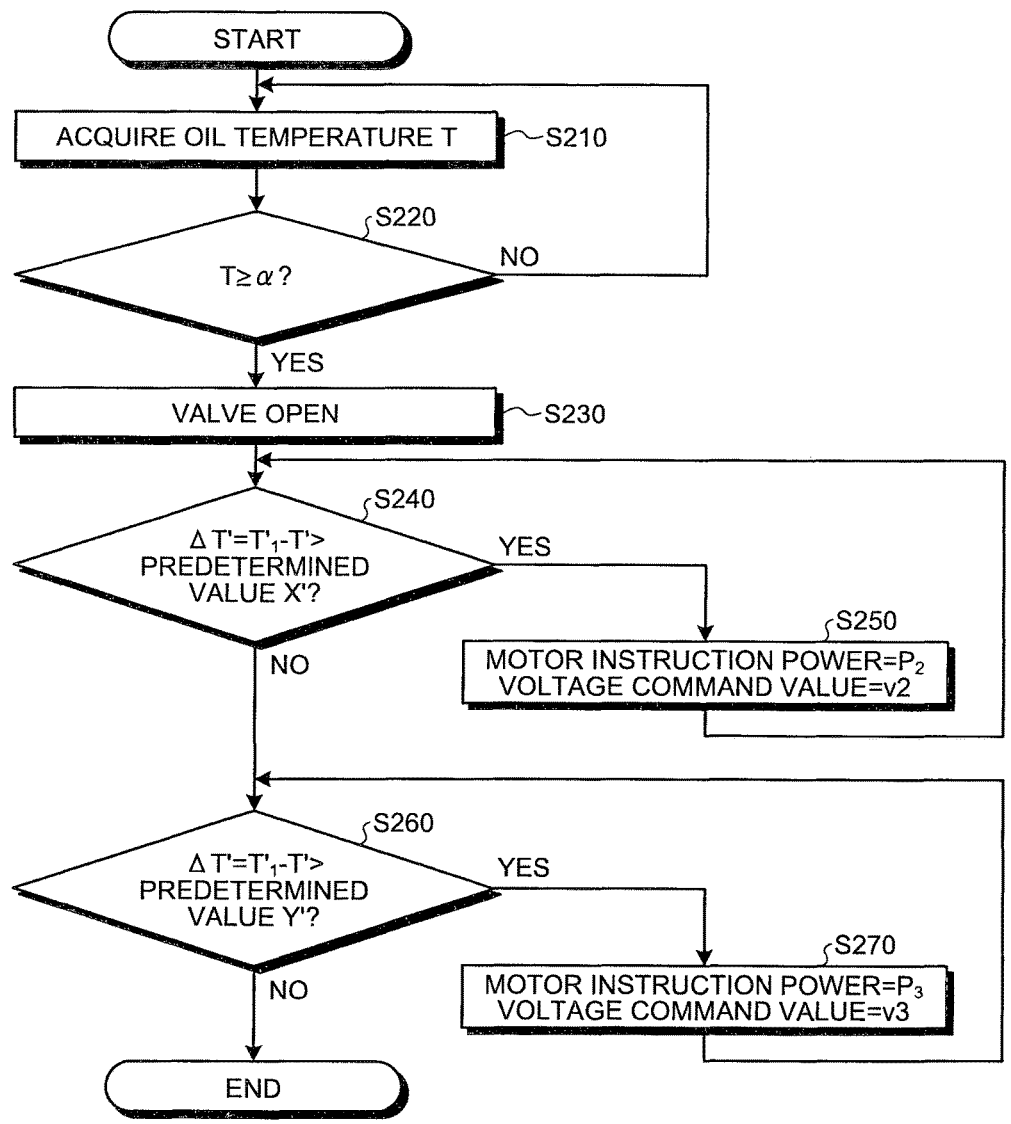
FIG. 7 is a flowchart illustrating the operation of a vehicle drive device according to a third embodiment.
Figure 8:
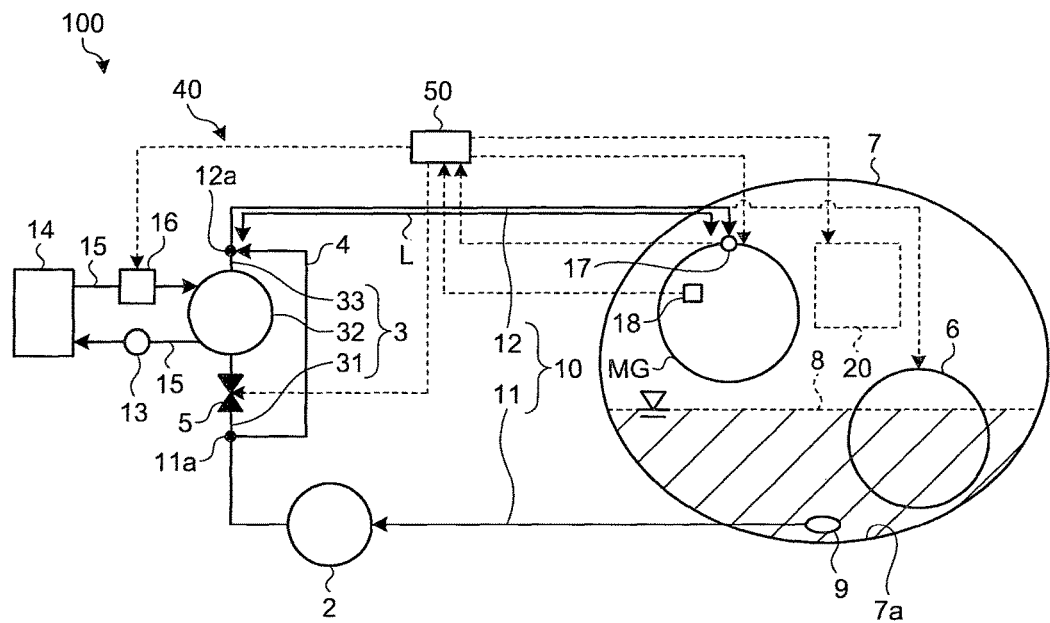
FIG. 8 is a schematic configuration diagram of the vehicle drive device according to the third embodiment.

A third embodiment will be described with reference to FIG. 7 and FIG. 8. In the third embodiment, the same reference numerals are denoted on the configuring elements having similar functions as those described in the first embodiment and the second embodiment, and the redundant description will be omitted. FIG. 7 is a flowchart illustrating the operation of a vehicle drive device according to the third embodiment, and FIG. 8 is a schematic configuration diagram of the vehicle drive device according to the third embodiment. The third embodiment differs from the first embodiment and the second embodiment in that the elapse of the predetermined period PE1 and the second predetermined period PE2 is determined based on the motor temperature T'.

As illustrated in FIG. 8, a vehicle drive device 40 according to the third embodiment is configured to include a temperature sensor 18. The temperature sensor 18 detects the temperature of the electric motor MG. The temperature sensor 18 detects the temperature of the stator of the electric motor MG, for example. A signal indicating the detection result of the temperature sensor 18 is output to the ECU 50.

The control flow illustrated in FIG. 7 is executed while the oil pump 2 is circulating the oil 8, for example. In step S210, the oil temperature T is acquired by the ECU 50, and in step S220, whether or not the acquired oil temperature T is higher than or equal to a predetermined value α is determined. As a result of the determination, the process proceeds to step S230 if the oil temperature T is higher than or equal to the predetermined value α and proceeds to step S210 in the opposite case.

In step S230, a valve opening command is issued by the ECU 50. The ECU 50 outputs the valve opening command to the control valve 5. The control valve 5 is opened in response to the valve opening command, and communicates the first oil passage 11 and the heat exchanging unit 32. After step S230 is executed, the process proceeds to step S240.

In step S240, whether or not a motor temperature decreasing amount ΔT' is greater than a predetermined value X' is determined by the ECU 50. In step S240, whether or not the predetermined period PE1 has elapsed is determined. The predetermined value X' is a threshold value for determining whether the predetermined period PE1 has elapsed and whether the second predetermined period PE2 is continuing. The second predetermined period PE2 is the duration from a time the motor temperature decreasing amount ΔT' becomes greater than the predetermined value X' until the motor temperature decreasing amount ΔT' becomes smaller than or equal to the predetermined value X'. The motor temperature decreasing amount ΔT' is calculated with the following equation (3). The motor temperature $T'_1$ is the temperature of the electric motor MG of when the control valve 5 is opened, and is, for example, the temperature detected by the temperature sensor 18 immediately before the control valve 5 is opened. The motor temperature T' on the right side of the equation (3) is the motor temperature T' detected by the temperature sensor 18, and is newly acquired each time step S240 is executed, for example.

$$\Delta T' = T'_1 - T' \qquad (3)$$

The predetermined value X' is preferably defined based on the adaptive experiments, and the like so that the determination can be made accurately and at as early timing as possible that the oil 8 stored in the oil cooler 3 reached the electric motor MG. As a result of the determination of step S240, the process proceeds to step S250 if determined that the motor temperature decreasing amount ΔT' is greater than the predetermined value X' (step S240-Y) and proceeds to step S260 in the opposite case (step S240-N).

In step S250, the motor instruction power P is corrected from the instruction power $P_1$ corresponding to the required output Pd to the instruction power $P_2$ of after the correction by the ECU 50. The ECU 50, for example, corrects the motor instruction power P and the voltage command value v to a small value on the low torque side, similar to step S80 of the first embodiment. After step S250 is executed, the process proceeds to step S240.

In step S260, whether or not the motor temperature decreasing amount ΔT' is greater than a predetermined value Y' is determined by the ECU 50. In step S260, whether the oil 8 stored in the oil cooler 3 all flowed out from the second oil passage 12 and the oil 8 that flowed from the first oil passage 11 through the oil cooler 3 is supplied to the electric motor MG is determined by the ECU 50. In the present embodiment, whether or not the second predetermined period PE2 has elapsed is determined based on the motor temperature T'. The predetermined value Y' and the predetermined value X' are positive values, respectively. The predetermined value Y' of step S260 is a value smaller than the predetermined value X' of step S240. After the second predetermined period PE2 has elapsed, the oil temperature T rises and the motor temperature decreasing amount ΔT' reduces. If the motor temperature decreasing amount ΔT' is smaller than the predetermined value X' and greater than the predetermined value Y', determination can be made that the oil 8 that flowed from the first oil passage 11 through the oil cooler 3 is supplied to the electric motor MG. When the oil temperature is raised and the motor temperature decreasing amount ΔT' becomes smaller than or equal to the predetermined value Y', that is, when the correction of the motor instruction power P and the voltage command value v based on the motor temperature T' is unnecessary such as when the control valve 5 is closed, negative determination is made in step S260. As a result of the determination of step S260, the process proceeds to step S270 if determined that the motor temperature decreasing amount ΔT' is greater than the predetermined value Y' (step S260-Y), and the present control flow is terminated in the opposite case (step S260-N).

In step S270, the motor instruction power P is corrected by the ECU 50. The ECU 50 corrects the motor instruction power P and the voltage command value v, similar to step S100 of the first embodiment, for example. After step S270 is executed, the process proceeds to step S260.

As described above, according to the present embodiment, the elapse of the predetermined period PE1 and the elapse of the second predetermined period PE2 are determined based on the detected motor temperature T'. In the control flow illustrated in FIG. 7, the predetermined period PE1 is the duration from a time the control valve 5 is switched to the second state until the decreasing amount (motor temperature decreasing amount ΔT') of the temperature of the electric motor MG detected by the temperature sensor 18 becomes greater than the predetermined value X'. The deviation of timing between the timing the resistance value of the copper wire portion of the electric motor MG lowers and the timing of starting the correction of the voltage command value v is suppressed as the elapse of the predetermined period PE1 and the second predetermined period PE2 is determined based on the actual temperature of the electric motor MG.

In determining the elapse of the predetermined period PE1, the determination based on the value of the motor temperature T' itself instead of the motor temperature decreasing amount ΔT' may be made. For example, determination may be made that the predetermined period PE1 elapsed when the temperature of the electric motor MG detected by the temperature sensor 18 becomes lower than or equal to a fifth predetermined value. In this case, the predetermined period PE1 is the duration from a time the control valve 5 is switched to the second state until the temperature of the electric motor MG detected by the temperature sensor 18 becomes smaller than or equal to the fifth predetermined value. The fifth predetermined value is preferably defined based on the adaptive experiments, and the like so that the change in the motor temperature V of when the oil 8 stored in the oil cooler 3 reached the electric motor MG can be determined accurately and at as an early stage as possible.

In determining the elapse of the predetermined period PE1, the determination based on the decreasing rate of the motor temperature T' instead of the motor temperature decreasing amount ΔT' may be made. The decreasing rate of the motor temperature T' is, for example, the motor temperature decreasing amount ΔT' per unit time. In this determination method, for example, determination is made that the predetermined period PE1 elapsed when the decreasing rate of the temperature of the electric motor MG detected by the temperature sensor 18 becomes greater than the fifth predetermined value. In this case, the predetermined period PE1 is the duration from a time the control valve 5 is switched to the second state until the decreasing rate of the temperature of the electric motor MG detected by the temperature sensor 18 becomes greater than the fifth predetermined value.

The elapse of the second predetermined period may be determined based on the rising rate of the motor temperature T'. When the rising rate of the motor temperature T' becomes greater than a predetermined rising rate after the elapse of the predetermined period PE1, determination is made that the second predetermined period PE2 elapsed. In this case, the second predetermined period is the duration from a time the predetermined period PE1 elapsed until the rising rate of the motor temperature T' becomes greater than the predetermined rising rate.

[First Variant of Each of the Embodiments Described Above]

A first variant of the first embodiment to third embodiment will now be described. The control valve 5 may be a flow rate control valve capable of being controlled to an arbitrary opening by a duty control, and the like instead of the open/close valve of being switched to the fully-opened state or the fully-closed state. When opening the control valve 5 so that the oil 8 flows through the oil cooler 3, the ECU 50 may take an intermediate opening between the fully-closed state and the fully-opened state. The fluctuation in the temperature of the oil 8 supplied to the electric motor MG is thus alleviated. However, even if the opening of the control valve 5 is controlled, the oil 8 of low temperature stored in the oil cooler 3 may be supplied to the electric motor MG after the opening of the control valve 5, and the motor effective power P' may diverge from the required output Pd. In such a case, the voltage command value v is corrected to the voltage value on the low torque side to suppress the output fluctuation of the electric motor MG.

The control valve 5 may be opened/closed according to the temperature of the oil 8 in contact therewith like a thermostat instead of being opened/closed according to a command from the ECU 50. In this case, the control valve 5 is preferably arranged to make contact with the oil 8 circulated by the oil pump 2. For example, the control valve 5 is preferably arranged at the end on the first oil passage 11 side in the inlet oil passage 31.

[Second Variant of Each of the Embodiments Described Above]

Figure 9:
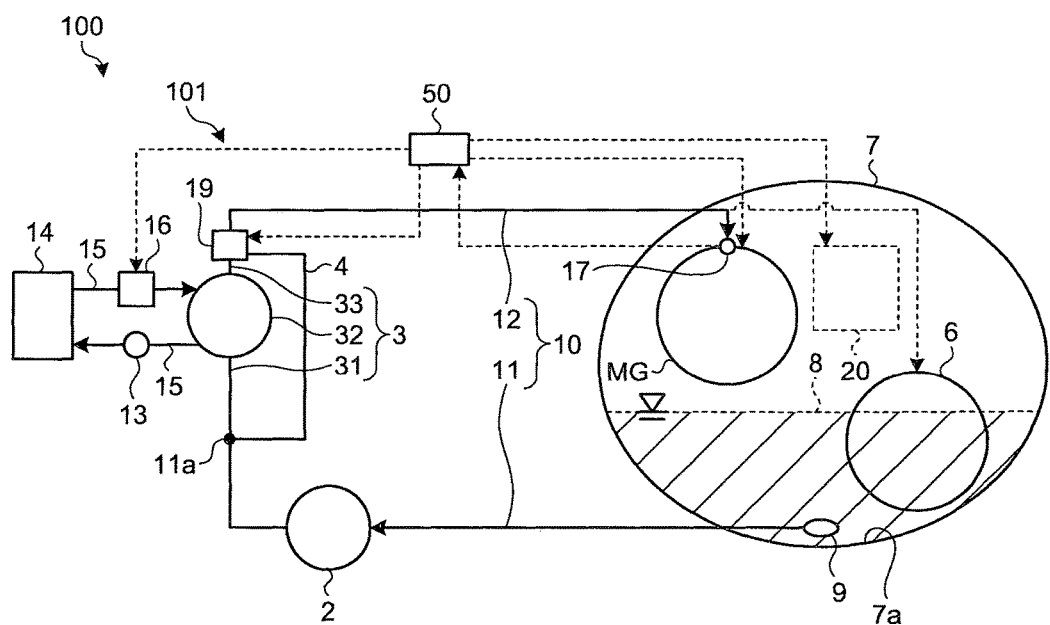
FIG. 9 is a schematic configuration diagram of a vehicle drive device according to a second variant of each embodiment.

A second variant of the first embodiment to third embodiment will now be described with reference to FIG. 9. FIG. 9 is a schematic configuration diagram of a vehicle drive device according to a second variant of each embodiment. The control valve is not limited to the control valve 5 illustrated in each of the embodiments described above. The control valve may be arranged at a connecting portion of the bypass oil passage 4 and the oil passage 10 as illustrated in FIG. 9. In a vehicle drive device 101 according to the second variant, a control valve 19 is arranged at a connecting portion of the bypass oil passage 4 and the second oil passage 12. The control valve 19 is a three-way valve, and is connected to each of the bypass oil passage 4, the outlet oil passage 33, and the second oil passage 12. The control valve 19 can be selectively switched between a first state and a second state. The first state of the control valve 19 is a state of communicating the bypass oil passage 4 and the second oil passage 12 and shielding the outlet oil passage 33 from the second oil passage 12. The second state of the control valve 19 is a state of communicating the outlet oil passage 33 and the second oil passage 12 and shielding the bypass oil passage 4 from the second oil passage 12. The control valve 19 includes an actuator for switching the first state and the second state. The actuator switches the first state and the second state by an electromagnetic force, for example.

The control valve 19 is controlled by the ECU 50. The ECU 50 keeps the control valve 19 in the first state and regulates the oil 8 from flowing through the oil cooler 3 while the temperature of the oil 8 circulated by the oil pump 2 is lower than a predetermined value. The ECU 50 switches the control valve 19 to the second state and let the oil 8 flow to the oil cooler 3 when the temperature of the oil 8 circulated by the oil pump 2 becomes higher than or equal to the predetermined value while the control valve 19 is in the first state.

The ECU 50 also corrects the voltage command value v of the electric motor MG to the voltage value on the low torque side than the voltage command value vd corresponding to the required output Pd of the electric motor MG after elapse of the predetermined period PE1 from a time the control valve 19 is controlled to be switched from the first state to the second state.

The control valve 19 may be arranged at the connecting portion of the bypass oil passage 4 and the first oil passage 11 instead of the connecting portion of the bypass oil passage 4 and the second oil passage 12. The first state in this case is a state of communicating the bypass oil passage 4 and the first oil passage 11 and shielding the inlet oil passage 31 from the first oil passage 11. The second state is a state of communicating the inlet oil passage 31 and the first oil passage 11 and shielding the bypass oil passage 4 from the first oil passage 11.

[Third Variant of Each of the Embodiments Described Above]

In each of the embodiments described above, the oil pump 2 may be arranged on the second oil passage 12 instead of the first oil passage 11. The number of electric motors MG is not limited to one. The vehicle drive device 1, 40, 101 may include a plurality of electric motors MG.

The contents disclosed in each of the embodiments and the variants described above may be appropriately combined and executed.

REFERENCE SIGNS LIST 1, 40, 101 vehicle drive device
2 oil pump
3 oil cooler
4 bypass oil passage
5, 19 control valve
6 differential gear
7 case
8 oil
10 oil passage
11 first oil passage
12 second oil passage
17 oil temperature sensor
18 temperature sensor
31 inlet oil passage
32 heat exchanging unit
33 outlet oil passage
50 ECU (control unit)
100 vehicle
101 vehicle drive device
v voltage command value
MG electric motor
T oil temperature
P motor instruction power
Pd required output
PE1 predetermined period

The invention claimed is:
1. A vehicle drive device comprising:
an oil pump configured to supply oil to an electric motor and a differential gear through an oil passage;
an oil cooler that is arranged on the oil passage and configured to cool the oil;
a bypass oil passage configured to bypass the oil cooler;
a control valve configured to be switched between a first state of regulating the oil from flowing through the oil cooler and a second state of letting the oil flow to the oil cooler; and
a control unit, wherein
the control unit keeps the control valve in the first state while a temperature of the oil circulated by the oil pump is lower than a predetermined value, and switches the control valve to the second state when the temperature of the oil circulated by the oil pump becomes not lower than the predetermined value while the control valve is in the first state, and
the control unit changes a voltage command value of the electric motor to a value smaller than a voltage command value corresponding to a required output of the electric motor after elapse of a predetermined period from a time the control valve is switched to the second state.

2. The vehicle drive device according to claim 1, wherein the predetermined period is duration defined in advance based on a length of the oil passage from a downstream side connecting portion of the oil passage and the bypass oil passage to the electric motor.

3. The vehicle drive device according to claim 1, further comprising:
an oil temperature sensor configured to detect a temperature of the oil supplied from the oil passage to the electric motor, wherein
the predetermined period is duration from a time the control valve is switched to the second state until the temperature of the oil detected by the oil temperature sensor becomes not higher than a second predetermined value.

4. The vehicle drive device according to claim 1, further comprising:
an oil temperature sensor configured to detect a temperature of the oil supplied from the oil passage to the electric motor, wherein
the predetermined period is duration from a time the control valve is switched to the second state until a decreasing amount of the temperature of the oil detected by the oil temperature sensor becomes greater than a third predetermined value, or from a time the control valve is switched to the second state until a decreasing rate of the temperature of the oil detected by the oil temperature sensor becomes greater than a fourth predetermined value.

5. The vehicle drive device according to claim 1, further comprising:
a temperature sensor configured to detect a temperature of the electric motor, wherein
the predetermined period is duration from a time the control valve is switched to the second state until the temperature of the electric motor detected by the temperature sensor becomes not higher than a fifth predetermined value.

6. The vehicle drive device according to claim 1, wherein when a second predetermined period has elapsed after the elapse of the predetermined period, the control unit changes the voltage command value to a voltage value greater than the voltage value in the second predetermined period.

7. The vehicle drive device according to claim 2, wherein when a second predetermined period has elapsed after the elapse of the predetermined period, the control unit changes the voltage command value to a voltage value greater than the voltage value in the second predetermined period.

8. The vehicle drive device according to claim 3, wherein when a second predetermined period has elapsed after the elapse of the predetermined period, the control unit changes the voltage command value to a voltage value greater than the voltage value in the second predetermined period.

9. The vehicle drive device according to claim 4, wherein when a second predetermined period has elapsed after the elapse of the predetermined period, the control unit changes the voltage command value to a voltage value greater than the voltage value in the second predetermined period.

10. The vehicle drive device according to claim 5, wherein
when a second predetermined period has elapsed after the elapse of the predetermined period, the control unit changes the voltage command value to a voltage value greater than the voltage value in the second predetermined period.

* * * * *